(12) United States Patent
Rakshit

(10) Patent No.: US 8,917,422 B2
(45) Date of Patent: Dec. 23, 2014

(54) DUPLICATION PREVENTION

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 13/873,594

(22) Filed: Apr. 30, 2013

(65) Prior Publication Data

US 2013/0233921 A1  Sep. 12, 2013

Related U.S. Application Data

(62) Division of application No. 12/862,839, filed on Aug. 25, 2010, now Pat. No. 8,456,707.

(51) Int. Cl.
| | | |
|---|---|---|
| G06K 5/04 | (2006.01) | |
| G06K 7/10 | (2006.01) | |
| G06K 15/00 | (2006.01) | |
| G06F 3/12 | (2006.01) | |
| H04N 1/46 | (2006.01) | |
| H04N 1/00 | (2006.01) | |
| G06K 7/14 | (2006.01) | |
| H04N 1/44 | (2006.01) | |

(52) U.S. Cl.
CPC ........ *G06K 15/4095* (2013.01); *H04N 1/00875* (2013.01); *B42D 2035/34* (2013.01); *G06K 7/1439* (2013.01); *H04N 2201/3249* (2013.01); *H04N 2201/0082* (2013.01); *H04N 1/4446* (2013.01); *G06K 15/407* (2013.01); *G06K 2215/0082* (2013.01); *H04N 2201/3209* (2013.01); *H04N 2201/327* (2013.01); *H04N 2201/0091* (2013.01); *H04N 2201/3208* (2013.01); *H04N 1/00846* (2013.01); *B42D 2035/50* (2013.01)
USPC ......... 358/1.9; 358/1.13; 358/1.14; 358/1.15; 358/537; 358/540; 235/462.02; 235/462.08; 235/462.09; 235/462.1

(58) Field of Classification Search
None
See application file for complete search history.

(56) References Cited

U.S. PATENT DOCUMENTS

| | | | |
|---|---|---|---|
| 6,644,764 | B2 | 11/2003 | Stephens, Jr. |
| 8,456,707 | B2 | 6/2013 | Rakshit |
| 2005/0012949 | A1* | 1/2005 | Kitahara et al. ............. 358/1.11 |
| 2006/0249951 | A1 | 11/2006 | Cruikshank et al. |

(Continued)

OTHER PUBLICATIONS

Notice of First Examination Opinions; SIPO, People's Republic of China; Application No. 201110244659.8; Date of Document Issuance Oct. 31, 2013; 16 pages; (Original Chinese version and English translation).

(Continued)

*Primary Examiner* — Benny Q Tieu
*Assistant Examiner* — Haris Sabah
(74) *Attorney, Agent, or Firm* — Schmeiser, Olsen & Watts; John Pivnichny (57) ABSTRACT

An invisible ink management method and system. The method includes receiving by a computer processor data associated with an image to be duplicated and a duplication command enabling reproduction of the image. The computer processor receives a command for enabling a duplication prevention functionality and generates a first copy of the image. The computer processor enables an invisible ink spray nozzle. In response, the invisible ink spray nozzle sprays a plurality of invisible images on the first copy. The plurality of invisible images are invisible under first lighting conditions and are visible under second lighting conditions.

13 Claims, 11 Drawing Sheets

(56) References Cited

U.S. PATENT DOCUMENTS

| | | | |
|---|---|---|---|
| 2008/0078836 A1* | 4/2008 | Tomita | 235/462.11 |
| 2008/0218792 A1 | 9/2008 | Murata et al. | |
| 2009/0122351 A1 | 5/2009 | Tsuchitoi | |
| 2009/0285458 A1* | 11/2009 | Allburn | 382/124 |
| 2012/0050753 A1 | 3/2012 | Rakshit | |

OTHER PUBLICATIONS

Invisible ink; http://en.wikipedia.org/wiki/Invisible_ink; 6 pages; May 5, 2010.

Chaum et al.; Scantegrity II: End-to-End Verifiability for Optical Scan Election Systems using Invisible Ink Confirmation Codes; USENIX/ACCURATE EVT 2008; 13 pages.

Office Action (Mail Date Nov. 9, 2012) for U.S. Appl. No. 12/862,839, filed Aug. 25, 2010.

Amendment filed Dec. 20, 2012 in response to Office Action (Mail Date Nov. 9, 2012) for U.S. Appl. No. 12/862,839, filed Aug. 25, 2010.

Notice of Allowance (Mail Date Feb. 6, 2013) for U.S. Appl. No. 12/862,839, filed Aug. 25, 2010.

* cited by examiner

FIG. 1

Print

Printer
Name: Printer
Status: Idle
Type:
Where:
Comment:

[Properties]
[ ] Print to file
[Find Printer...]

Page range
(•) All
( ) Current page
( ) Pages:
Enter page numbers and/or page ranges separated by commas. For example, 1,3,5–12

Copies
Number of copies: 1
[x] Collate

Print what: Document
Print: All pages in range

Zoom
Pages per sheet: 1 page
Scale to paper size: No Scaling

[x] Prevent Duplication — 208

[Options...] [OK] [Cancel]

DUPLICATION PREVENTION

This application is a divisional application claiming priority to Ser. No. 12/862,839, filed Aug. 25, 2010.

FIELD

The present invention relates to a method and associated system for preventing documents from being duplicated.

BACKGROUND

Managing protected data typically comprises an inefficient process with little flexibility. Accordingly, there exists a need in the art to overcome the deficiencies and limitations described herein above.

SUMMARY

The present invention provides a method comprising: receiving, by a computer processor of a computing device, data associated with an image to be duplicated; receiving, by said computer processor, a first duplication command enabling reproduction of said image; presenting, by said computer processor to a user in response to said receiving said first duplication command, a graphical user interface (GUI) for enabling a duplication prevention functionality; receiving, by said computer processor from said user in response to said presenting, a command for enabling said duplication prevention functionality; generating, by said computer processor in response to said first duplication command, a first copy of said image; and enabling, by said computer processor in response to said command for enabling said duplication prevention functionality, an invisible ink spray nozzle, wherein said invisible ink spray nozzle sprays, in response to said enabling, a plurality of invisible images on said first copy, wherein said plurality of invisible images are invisible under first lighting conditions, and wherein said plurality of invisible images are visible under second lighting conditions.

The present invention provides computer program product, comprising a computer readable storage medium having a computer readable program code embodied therein, said computer readable program code comprising an algorithm adapted to implement a method within a computing device, said method comprising: receiving, by a computer processor of a computing device, data associated with an image to be printed; receiving, by said computer processor, a first duplication command enabling reproduction of said image; presenting, by said computer processor to a user in response to said receiving said first duplication command, a graphical user interface (GUI) for enabling a duplication prevention functionality; receiving, by said computer processor from said user in response to said presenting, a command for enabling said duplication prevention functionality; generating, by said computer processor in response to said first duplication command, a first copy of said image; and enabling, by said computer processor in response to said command for enabling said duplication prevention functionality, an invisible ink spray nozzle, wherein said invisible ink spray nozzle sprays, in response to said enabling, a plurality of invisible images on said first copy, wherein said plurality of invisible images are invisible under first lighting conditions, and wherein said plurality of invisible images are visible under second lighting conditions.

The present invention provides a method comprising: receiving, by said computer processor, a print command for printing a first image; generating, by said computer processor in response to said print command, a first printed copy of said first image; receiving, by said computer processor, a selection of specified barcodes for objects of said first image of said first printed copy; generating, by said computer processor, said specified barcodes; associating, by said computer processor in response to said generating, said specified bar codes with said objects; receiving, by said computer processor in response to said associating, a barcode print command for printing said specified barcodes over associated objects of said objects; and generating, by said computer processor in response to said barcode print command, a copy of said first image comprising said each of said specified barcodes over said associated objects, wherein said generating comprises enabling an ink spray nozzle, wherein said ink spray reproduces, in invisible ink, invisible copies of each of said specified barcodes, wherein each invisible copy of said invisible copies is placed over an associated object of said associated objects, wherein each said invisible copy is invisible under first lighting conditions, and wherein each said invisible copy is visible under second lighting conditions.

The present invention provides method comprising: detecting, by a computer processor of a mobile computing device, an invisible copy of a specified barcode located over an associated object of a first image, wherein said invisible copy of said specified barcode is invisible under first lighting conditions, wherein said invisible copy of said specified barcode is visible under second lighting conditions, and wherein said detecting comprises enabling said second lighting conditions; decoding, by said computer processor, said specified barcode , wherein said decoding comprises retrieving data comprising information associated with said associated object; superimposing, by said computer processor, said information over said associated object; displaying, by said computer processor, said information superimposed over said associated object; receiving, by said computer processor, a command associated with performing a function associated with said information and said associated object; and enabling, by said computer processor, said function.

The present invention advantageously provides a simple method and associated system capable of managing protected data.

DETAILED DESCRIPTION

Figure 1:
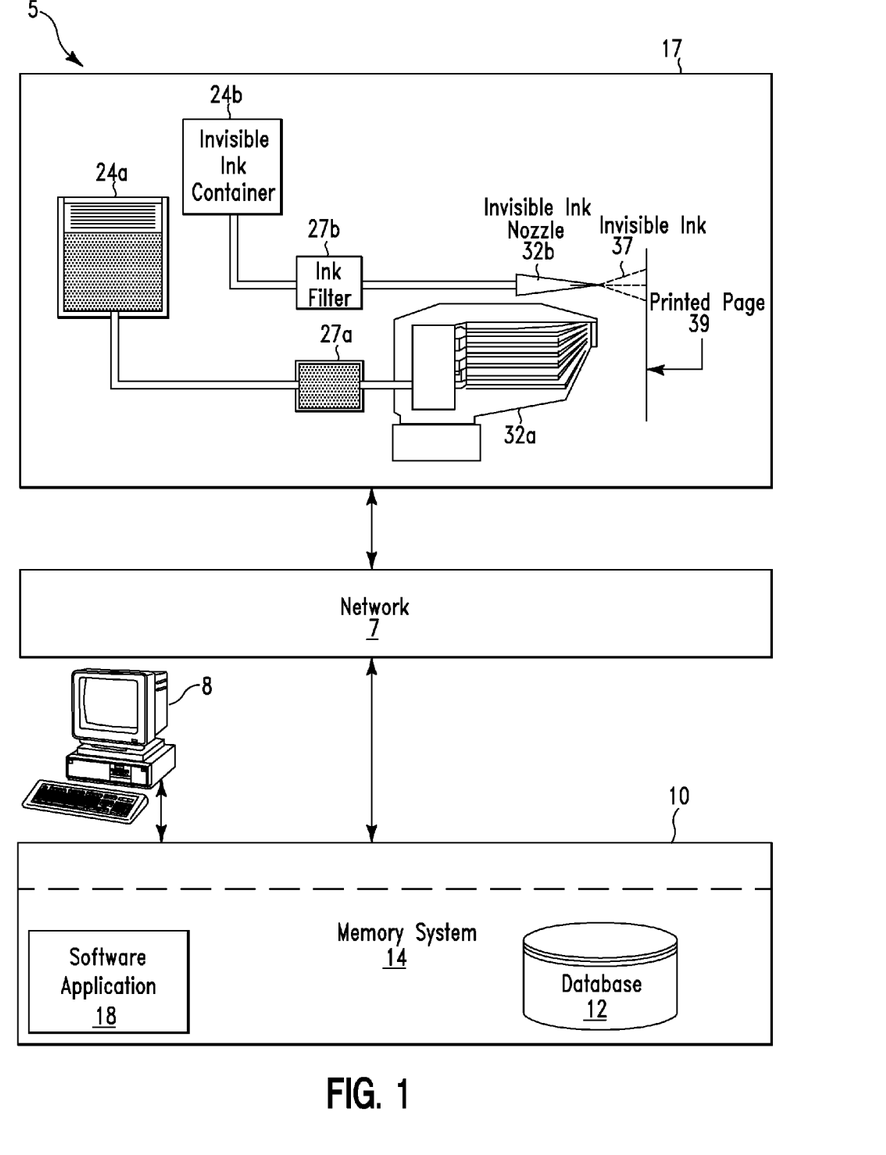
FIG. 1 illustrates a system for generating and managing invisible ink enabled images, in accordance with embodiments of the present invention.

FIG. 1 illustrates a system 5 for generating and managing invisible ink enabled images, in accordance with embodiments of the present invention. System 5 enables a method for preventing unauthorized image duplication. Image duplication may include, inter alia, duplicating an image (e.g., a document with text and images, a photograph, a computer scanned image, etc) by photocopying, scanning, etc. System 5 enables an invisible ink spray nozzle 32b such that a plurality of invisible images (i.e., generated from invisible ink) are added to an existing document. The plurality of invisible images are only visible under certain lighting conditions (e.g., ultraviolet light, infrared light, etc). Invisible ink is defined herein as a substance used for writing/printing which is invisible upon application and may be made visible by some means (e.g., ultraviolet light, infrared light, etc).

System 5 additionally enables method for generating invisible barcodes (i.e., comprising encoded information) over portions of an image (e.g., a poster, a photograph, scenery, etc) so that the invisible barcodes are only viewable and readable by equipped devices (e.g., comprising infrared lighting devices). The invisible barcodes may be associated with information describing and/or associated with portions of the image associated with the barcodes. The barcodes are printed with invisible ink in different image objects so that a viewer cannot detect the barcodes. Only an infrared enabled device (e.g., a mobile phone) may read the barcode content. The barcode content may comprise different text content, specifications, website address, contact telephone number, etc. If a website address is associated with the barcode, then a user may click on a URL and a Webpage may be opened in a new browser.

System 5 of FIG. 1 comprises a printing apparatus 17 connected through a network 7 to a computing system 10. Additionally, a computing device 8 (i.e., for issuing commands for printing apparatus 17) may be connected to computing system 10. Computing device 8 may comprise any type of computing device such as, inter alia, a computer, a cellular telephone, a PDA, a laptop computer, a tablet computer, etc. Network 7 may comprise any type of network including, inter alia, a telephone network, a local area network, (LAN), a wide area network (WAN), the Internet, a wireless network, etc. Computing system 10 may comprise any type of computing system(s) including, inter alia, a computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12.

Printing apparatus 17 comprises a standard ink container 24a, an invisible ink container 24b, ink filters 27a and 27b, a standard ink nozzle 32a for spraying ink to generate an image, and an invisible ink nozzle 32b for spraying invisible ink over a generated image on a printed page 39.

Software application 18 enables the following implementation example with respect to performing a method for generating images associated with preventing unauthorized image duplication:

1. A user sends a print command to printing apparatus 17.
2. Software application 18 enables standard ink nozzle 32a to generate a printed image.
3. Software application 18 enables a prevent duplication command.
4. Software application 18 enables invisible ink nozzle 32b to generate invisible images at various locations over the printed image.

Software application 18 (or any printer with invisible ink detection) enables the following implementation example with respect to preventing unauthorized image duplication:

1. A user places a printed image (i.e., comprising invisible images at various locations over the printed image) on a printer/copier (e.g., printing apparatus 17) to generate a copy (e.g., a photocopy, a scanned copy, etc).
2. The printer/copier analyzes the printed image under normal lighting conditions (e.g., incandescent lighting conditions, fluorescent lighting conditions, etc).
3. The printer/copier analyzes the printed image under invisible ink detection lighting conditions (e.g., ultraviolet lighting conditions, infrared lighting conditions, etc).
4. The printer/copier compares a first image from the analysis under normal lighting conditions to a second image from the analysis under invisible ink detection lighting conditions and determines that the first image does not match the second image (i.e., the second image comprises detected images comprised by the invisible ink).
5. The printer/copier disables the ability to generate copy (e.g., a photocopy, a scanned image, etc) of the printed image.

Software application 18 enables the following implementation example with respect to performing a method for generating invisible barcodes over portions of an image:

1. Software application 18 enables standard ink nozzle 32a to generate a printed image (e.g., a poster, a photograph, etc).
2. Software application 18 selects (e.g., from database 12) or generates a plurality of barcodes comprising information associated with different objects within the printed image. Each barcode of the plurality of barcodes may describe or comprise, inter alia, a name for different individuals in a photograph, an advertisement for different objects within the printed image (e.g., sunglasses, clothing, etc), descriptions for different objects within the printed image, Website addresses or contact phone numbers for different objects within the printed image (e.g., for purchasing purposes), specifications for different objects within the printed image (e.g., an aluminum window, marble of wood floors, etc).
3. Software application 18 enables invisible ink nozzle 32b print (i.e., in invisible ink) each barcode of the plurality of barcodes superimposed over an associated object within the printed image. Therefore, the barcodes printed in invisible ink are only viewable under invisible ink detection lighting conditions (e.g., ultraviolet lighting conditions, infrared lighting conditions, etc).

Software application 18 (or any portable device comprising appropriate lighting apparatus and detection software) enables the following implementation example with respect to performing a method for detecting and reading invisible barcodes over portions of an image:

1. A person viewing a picture or poster (i.e., comprising barcodes printed in invisible ink over image objects) would like to receive information associated with the image objects.
2. The person uses a portable device (e.g., a cellular phone, a PDA, digital camera, etc) equipped with an appropriate lighting apparatus and detection software to detect the barcodes printed in invisible ink. Each detected invisible barcode is decoded (i.e., as the person scans the portable device over the detected barcode) and associated information (i.e., from the decoded barcode) is displayed superimposed over the associated image object) for the person via a display on the portable device. The associated information may comprise, inter alia, an advertisement, contact number, detailed information, a specification, a Website address, etc for the associated image object. The associated information may comprise a generated link to additional information or Website. For example, the person may scroll a curser over the associated information comprising the generated link and enable (e.g., by clicking a button) the link resulting in a Website displayed for the person.

Figure 2:
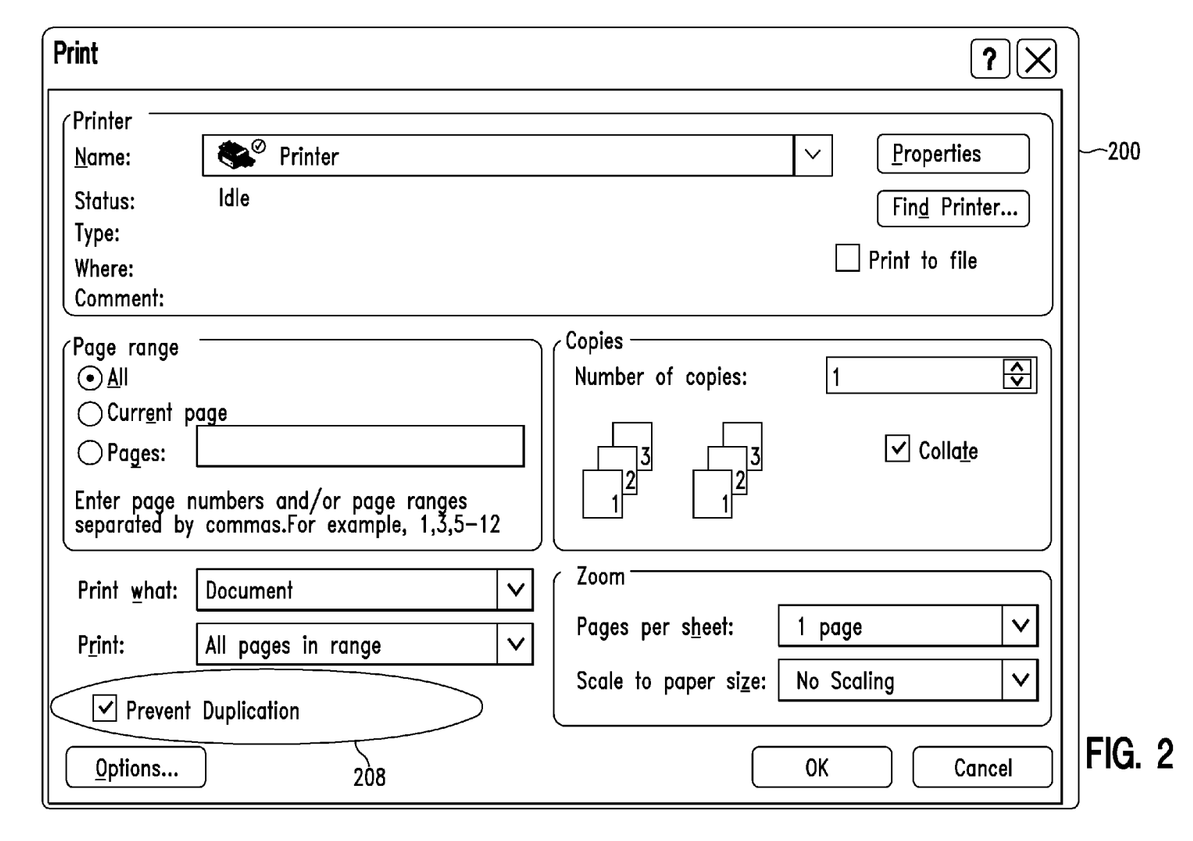
FIG. 2 illustrates a screen shot associated enabling a printing apparatus for preventing unauthorized image duplication, in accordance with embodiments of the present invention.

FIG. 2 illustrates a screen shot 200 associated enabling printing apparatus 17 (i.e., of FIG. 1) for preventing unauthorized image duplication, in accordance with embodiments of the present invention. Screen shot 200 comprises a print screen that includes a prevent duplication selection box 208 for enabling printing apparatus 17 to activate invisible ink nozzle 32b (i.e., of FIG. 1).

Figure 3A:
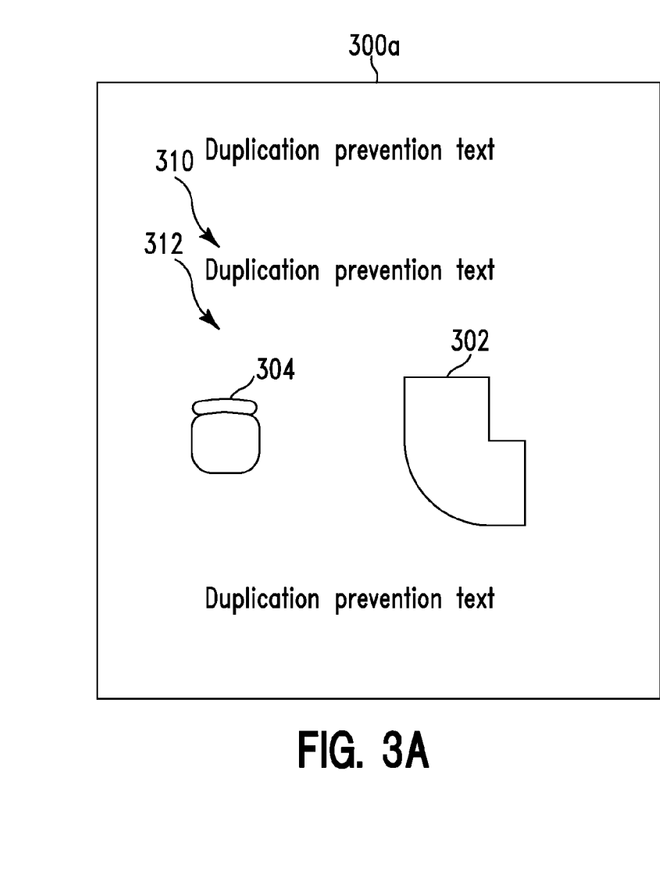
FIGS. 3A and 3B illustrate an image comprising text, images, and invisible ink generated images, in accordance with embodiments of the present invention.
Figure 3B:
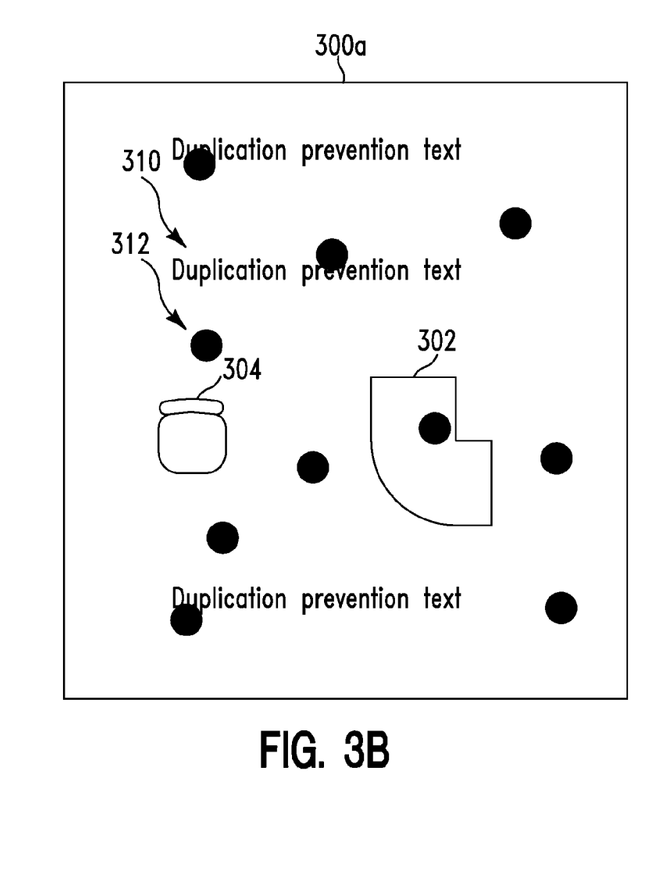

FIGS. 3A and 3B illustrate an image 300a comprising text 310, images 302 and 304, and invisible ink generated images 312, in accordance with embodiments of the present invention. FIG. 3A illustrates image 300a viewed under normal lighting conditions (e.g., incandescent lighting conditions, fluorescent lighting conditions, etc). Under normal lighting conditions, invisible ink generated images 312 are not visible as illustrated in FIG. 3A. FIG. 3B illustrates image 300a viewed under detection lighting conditions (e.g., ultraviolet lighting conditions, infrared lighting conditions, etc). Under detection lighting conditions, invisible ink generated images 312 are visible as illustrated in FIG. 3B.

Figure 4A:
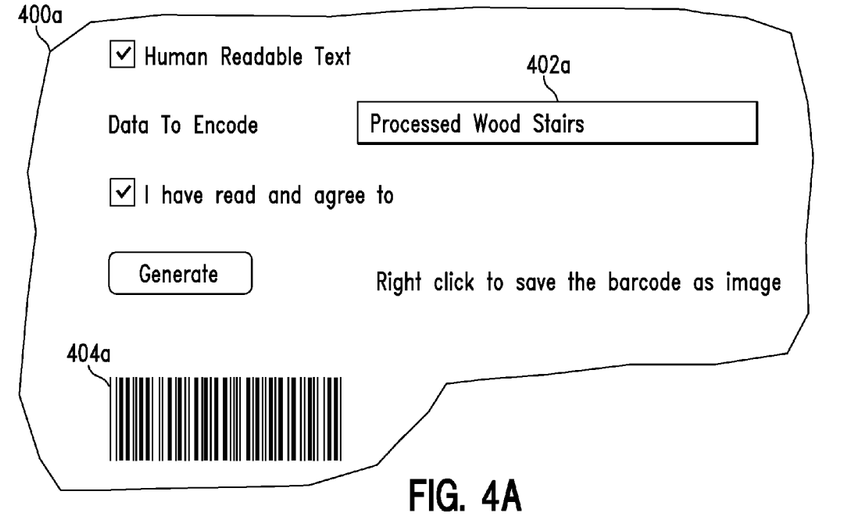
FIGS. 4A and 4B illustrate screen shots associated with implementation of a method for generating invisible barcodes over portions of an image, in accordance with embodiments of the present invention.
Figure 4B:
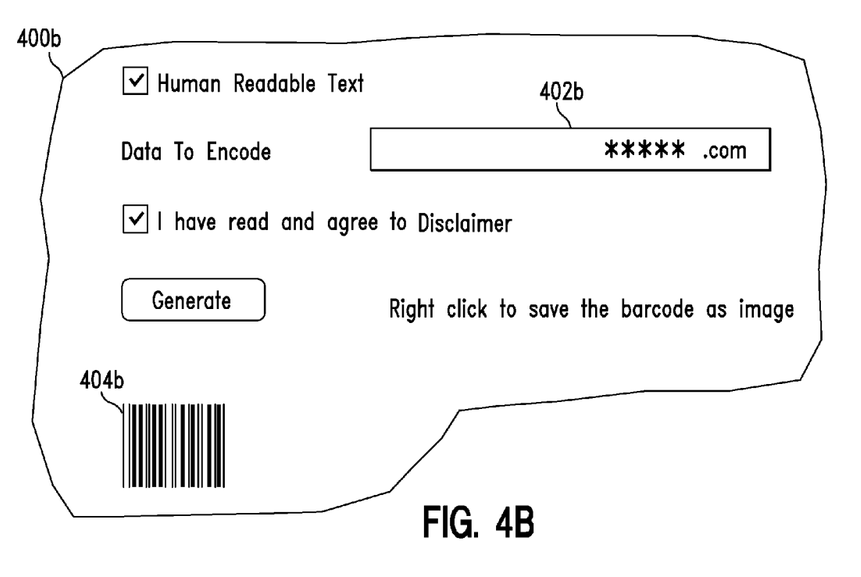

FIGS. 4A and 4B illustrate screen shots associated with implementation of a method for generating invisible barcodes over portions of an image enabled by system 5 of FIG. 1, in accordance with embodiments of the present invention. Screen shot 400a (in FIG. 4A) comprises an activation screen comprising data to encode box 402a (i.e., comprising a description for object in an image as illustrated in FIG. 5C and described, supra) and associated barcode 404a to be printed in invisible ink. Screen shot 400b (in FIG. 4B) comprises an activation screen comprising data to encode box 402b (i.e., comprising a Web address for purchasing or viewing details for an object in an image as illustrated in FIG. 5C and described, supra) and associated barcode 404b to be printed in invisible ink.

Figure 5A:
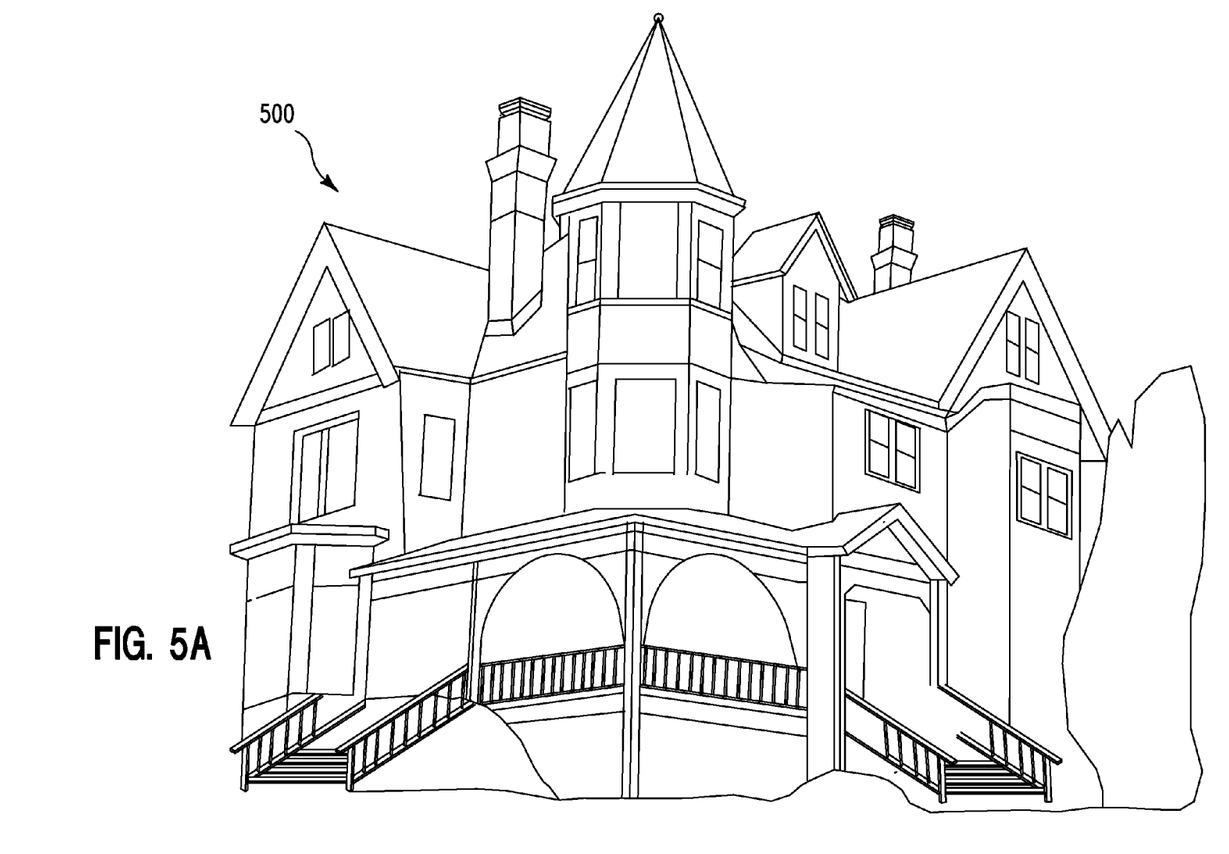
FIGS. 5A-5C illustrate an image of a house, in accordance with embodiments of the present invention.
Figure 5B:
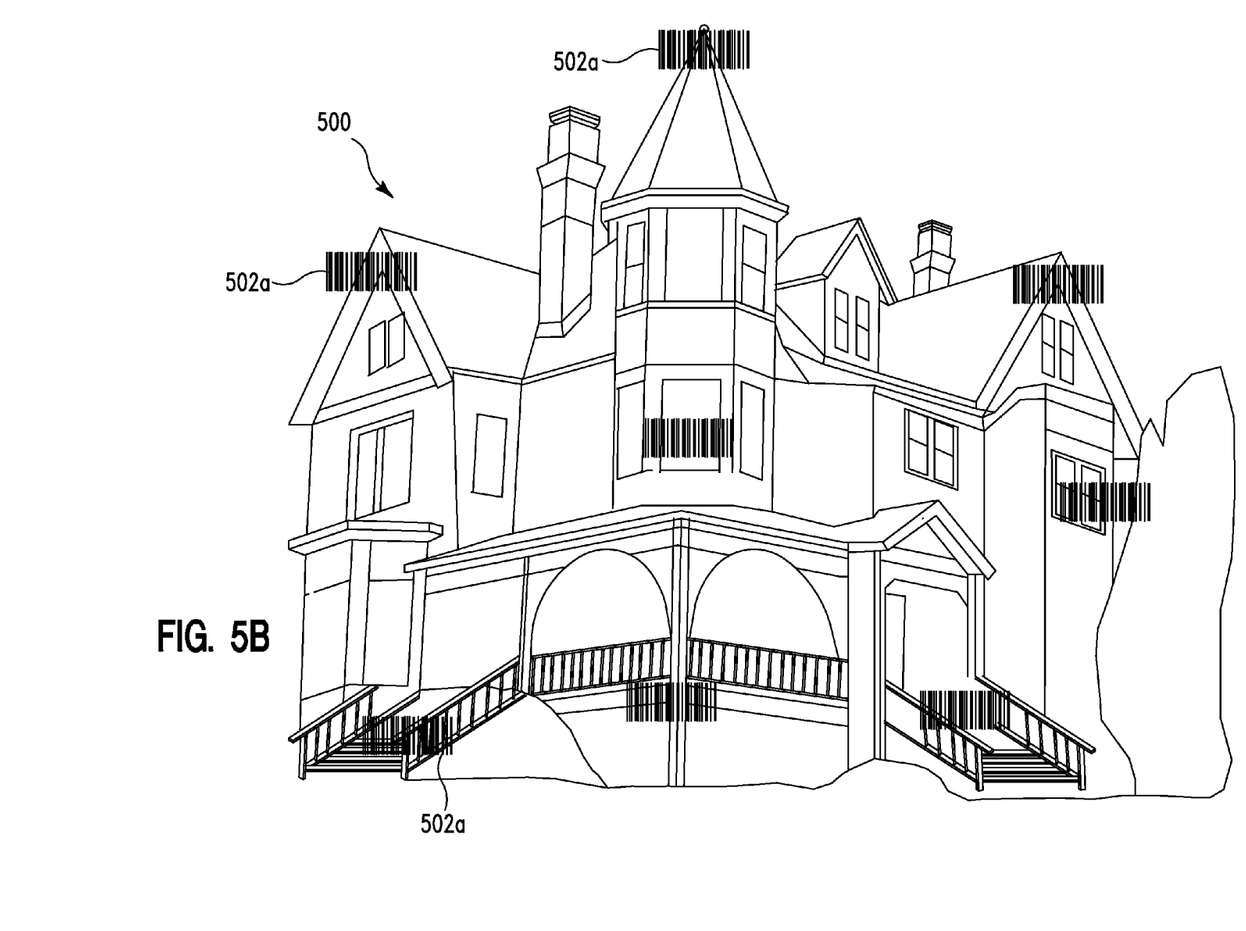
Figure 5C:
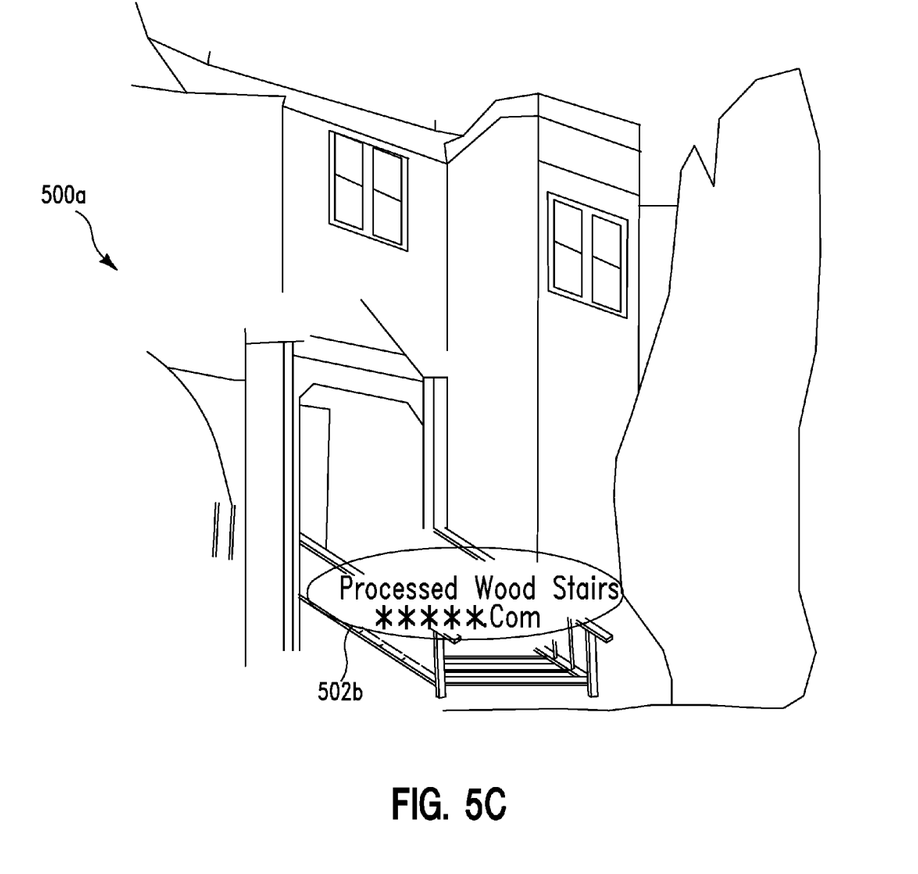

FIGS. 5A-5C illustrate an image 500 of a house, in accordance with embodiments of the present invention. FIG. 5A illustrates image 500 viewed under normal lighting conditions (e.g., incandescent lighting conditions, fluorescent lighting conditions, etc). Under normal lighting conditions, invisible ink generated barcodes 502a and associated descriptions 502b are not visible as illustrated in FIG. 5A. FIG. 5B illustrates image 500 comprising invisible ink generated barcodes 502a detected by a portable device. FIG. 5C illustrates a portion 500a of image 500 comprising decoded descriptions (i.e., viewable via the portable device) associated with one of the invisible ink generated barcodes 502a detected and decoded by the portable device.

Figure 6:
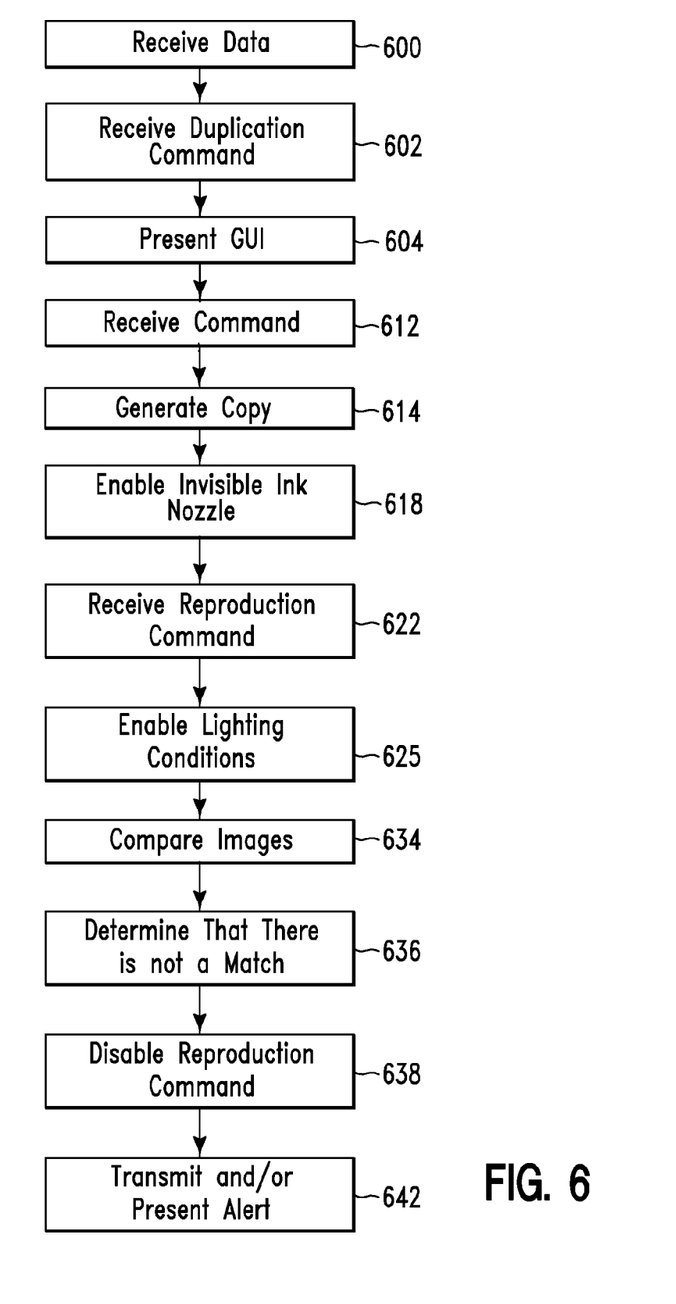
FIG. 6 illustrates an algorithm used by the system of FIG. 1 for implementing a method for preventing unauthorized image duplication, in accordance with embodiments of the present invention.

FIG. 6 illustrates an algorithm used by system 5 of FIG. 1 for implementing a method for preventing unauthorized image duplication, in accordance with embodiments of the present invention. In step 600, a computer processor of a computing device (e.g., computing device 10 in FIG. 1) receives data associated with an image to be duplicated. In step 602, the computer processor receives a duplication command enabling reproduction of the image. In step 604, the computer processor presents (to a user in response to receiving the duplication command) a graphical user interface (GUI) for enabling a duplication prevention functionality. In step 612, the computer processor receives (from the user via the GUI) a command for enabling the duplication prevention functionality. In step 614, the computer processor generates (i.e., in response to duplication command) a first copy of the image. In step 618, the computer processor enables (i.e., in response to command for enabling the duplication prevention functionality) an invisible ink spray nozzle (e.g., invisible ink spray nozzle 32b in FIG. 1). In response, the invisible ink spray nozzle sprays a plurality of invisible images (e.g., invisible ink generated images 312 in FIGS. 3A and 3B) on the first copy. The plurality of invisible images are invisible under normal lighting conditions (e.g., incandescent lighting conditions, fluorescent lighting conditions, etc) and visible under detection lighting conditions (e.g., ultraviolet lighting conditions, infrared lighting conditions, etc). In step 622, the computer processor receives a reproduction command for reproducing the first copy comprising the plurality of invisible images. For example, a user would like to make a photocopy of the first copy comprising the plurality of invisible images. In step 625, the computer processor enables normal lighting conditions and detection lighting conditions with respect to the first copy comprising the plurality of invisible images. In step 634, the computer processor retrieves a first image of the first copy comprising the plurality of invisible images with respect to normal lighting conditions and a second image of said first copy comprising the plurality of invisible images with respect to the detection lighting conditions. The first image is compared to the second image. In step 636, it is determined (i.e., based on the comparison between the first image and second image in step 634) that that the first image does not match the second image. In step 638, the computer processor disables the reproduction command for reproducing the first copy comprising the plurality of invisible images. In step 642, the computer processor generates and presents an alert indicating that the first copy may not be reproduced.

Figure 7:
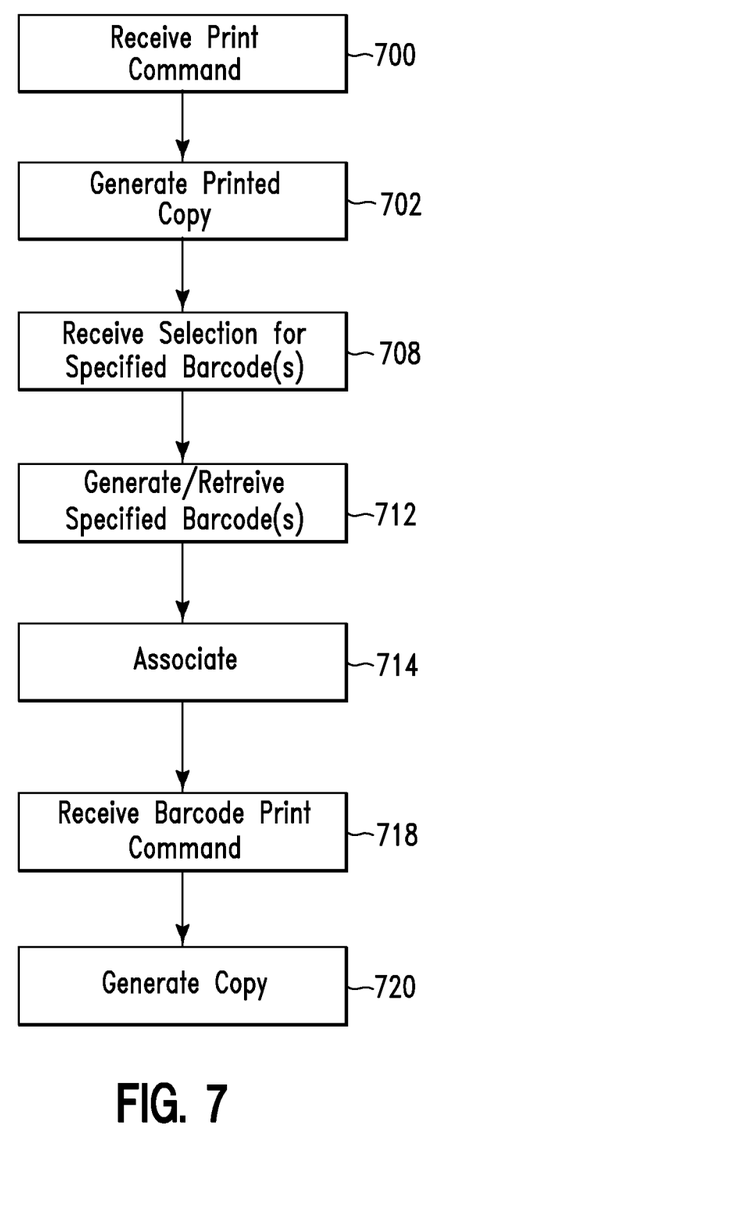
FIG. 7 illustrates an algorithm used by the system of FIG. 1 for implementing a method for generating invisible barcodes, in accordance with embodiments of the present invention.

FIG. 7 illustrates an algorithm used by system 5 of FIG. 1 for implementing a method for generating invisible barcodes, in accordance with embodiments of the present invention. In step 700, a computer processor of a computing device (e.g., computing device 10 in FIG. 1) receives, a print command for printing a first image. In step 702, the computer processor generates (i.e., in response to the print command) a first printed copy of the first image. In step 708, the computer processor receives a selection for specified barcodes for objects of the first image of the first printed copy. In step 712, the computer processor generates or retrieves from a database, the specified barcodes. In step 714, the computer processor associates specified bar codes with the associated objects. In step 718, the computer processor receives a barcode print command for printing the specified barcodes (i.e., in invisible ink) over the associated objects. In step 720, the computer processor generates (in response to the barcode print command) a copy of the first image comprising each of the specified barcodes (in invisible ink) over the associated objects. Generating the copy of the first image comprises enabling an invisible ink spray nozzle (e.g., invisible ink spray nozzle 32b in FIG. 1). The invisible ink spray nozzle reproduces in invisible ink, invisible copies of each of the specified barcodes.

Figure 8:
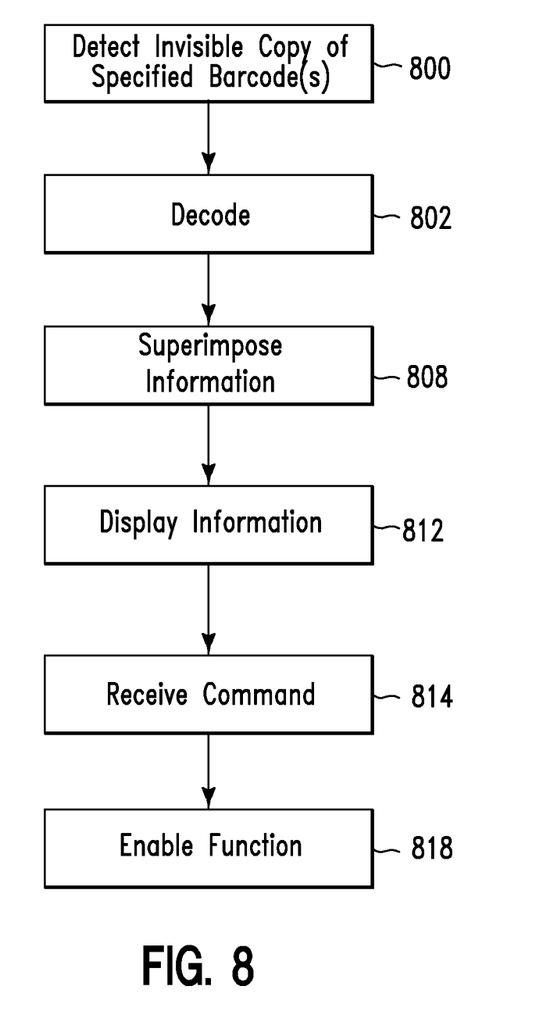
FIG. 8 illustrates an algorithm used by the system of FIG. 1 for implementing a method for detecting and decoding invisible barcodes, in accordance with embodiments of the present invention.

FIG. 8 illustrates an algorithm used by system 5 of FIG. 1 for implementing a method for detecting and decoding invisible barcodes, in accordance with embodiments of the present invention. In step 800, a computer processor of a mobile computing device detects (i.e., when a user uses the mobile computing device to scan an image such as a poster) an invisible copy of a specified barcode located over an associated object of the image. The invisible copy of the specified barcode is invisible under normal lighting conditions and visible detection lighting conditions (i.e., enabled by the mobile computing device). In step 802, the computer processor decodes the specified barcode. The decoding process includes retrieving data comprising information associated with the associated object (e.g., a description). In step 808, the computer processor superimposes the information over the associated object. In step 812, the computer processor displays (i.e., via a display portion of the mobile computing device) the information superimposed over the associated object. In step 812, the computer processor receives (i.e., from a user viewing the information superimposed over the associated object) a command associated with performing a function associated with the information and the associated object. In step 818, the computer processor enables the function. The function may include, inter alia, automatically dialing a telephone number associated with the associated object, automatically connecting to a Website associated with the associated object, automatically copying the information and transmitting the information to a remote location, automatically submitting a product order associated with the information, etc.

Figure 9:
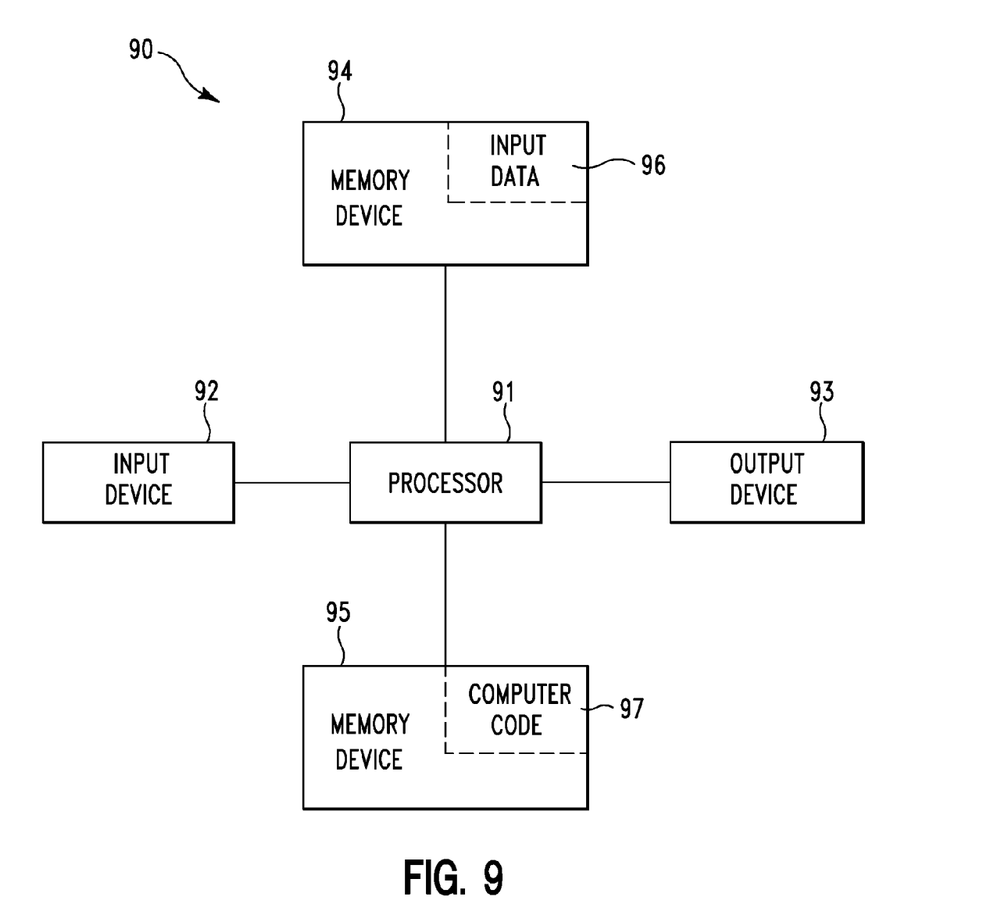
FIG. 9 illustrates a computer apparatus used for generating and managing invisible ink enabled images, in accordance with embodiments of the present invention.

FIG. 9 illustrates a computer apparatus 90 (e.g., computing system 10 of FIG. 1) used for generating and managing invisible ink enabled images, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 6-8) for generating and managing invisible ink enabled images. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may comprise the algorithms of FIGS. 6-8 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to generate and manage invisible ink enabled images. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating and managing invisible ink enabled images. In another embodiment, the invention provides a method that performs the process steps of the invention on a subscription, advertising, and/or fee basis. That is, a service provider, such as a Solution Integrator, could offer to generate and manage invisible ink enabled images. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computer processor of a computing system, a print command for printing a first image;
generating, by said computer processor in response to said print command, a first printed copy of said first image;
receiving, by said computer processor, a selection of specified barcodes for objects of said first image of said first printed copy;
generating, by said computer processor, said specified barcodes;
associating, by said computer processor in response to said generating, said specified bar codes with said objects;
receiving, by said computer processor in response to said associating, a barcode print command for printing said specified barcodes over associated objects of said objects; and
generating, by said computer processor in response to said barcode print command, a copy of said first image comprising said each of said specified barcodes over said associated objects, wherein said generating comprises enabling an ink spray nozzle, wherein said ink spray reproduces, in invisible ink, invisible copies of each of said specified barcodes, wherein each invisible copy of said invisible copies is placed over an associated object of said associated objects, wherein each said invisible copy is invisible under first lighting conditions, and wherein each said invisible copy is visible under second lighting conditions.

2. The method of claim 1, wherein each of said specified barcodes comprises data associated with said associated objects.

3. The method of claim 1, wherein said data comprises information selected from the group consisting of an advertisement, a contact telephone number, detail information, a specification, and a Website address.

4. The method of claim 1, further comprising:
providing at least one support service for at least one of creating, integrating, hosting, maintaining, and deploying computer-readable code in said computing system, wherein the code in combination with the computing system is capable of performing: said receiving said print command, said generating said first printed copy, said receiving said selection, said generating said specified barcodes, said associating, said receiving said barcode print command, and said generating said copy.

5. A computer program product, comprising a computer readable hardware storage device storing a computer readable program code, said computer readable program code comprising an algorithm adapted to implement a method within a computing device, said method comprising:
receiving, by a computer processor of a computing system, a print command for printing a first image;
generating, by said computer processor in response to said print command, a first printed copy of said first image;
receiving, by said computer processor, a selection of specified barcodes for objects of said first image of said first printed copy;
generating, by said computer processor, said specified barcodes;
associating, by said computer processor in response to said generating, said specified bar codes with said objects;
receiving, by said computer processor in response to said associating, a barcode print command for printing said specified barcodes over associated objects of said objects; and
generating, by said computer processor in response to said barcode print command, a copy of said first image comprising said each of said specified barcodes over said associated objects, wherein said generating comprises enabling an ink spray nozzle, wherein said ink spray reproduces, in invisible ink, invisible copies of each of said specified barcodes, wherein each invisible copy of said invisible copies is placed over an associated object of said associated objects, wherein each said invisible copy is invisible under first lighting conditions, and wherein each said invisible copy is visible under second lighting conditions.

6. The computer program product of claim 5, wherein each of said specified barcodes comprises data associated with said associated objects.

7. The computer program product of claim 5, wherein said data comprises information selected from the group consisting of an advertisement, a contact telephone number, detail information, a specification, and a Website address.

8. A method comprising:
detecting, by a computer processor of a mobile computing device, an invisible copy of a specified barcode located over an associated object of a first image, wherein said invisible copy of said specified barcode is invisible under first lighting conditions, wherein said invisible copy of said specified barcode is visible under second lighting conditions, and wherein said detecting comprises enabling said second lighting conditions;
decoding, by said computer processor, said specified barcode, wherein said decoding comprises retrieving data comprising information associated with said associated object;
superimposing, by said computer processor, said information over said associated object;
displaying, by said computer processor, said information superimposed over said associated object;
receiving, by said computer processor, a command associated with performing a function associated with said information and said associated object; and
enabling, by said computer processor, said function.

9. The method of claim 8, wherein said enabling said function comprises automatically dialing a telephone number associated with said associated object.

10. The method of claim 8, wherein said enabling said function comprises automatically connecting to a Website associated with said associated object.

11. The method of claim 8, wherein said enabling said function comprises automatically copying said information and transmitting said information to a remote location.

12. The method of claim 8, wherein said enabling said function comprises automatically submitting a product order associated with said information.

13. The method of claim 8, further comprising:
providing at least one support service for at least one of creating, integrating, hosting, maintaining, and deploying computer-readable code in said computing system, wherein the code in combination with the computing system is capable of performing: said detecting, said decoding, said superimposing, said displaying, said receiving, and said enabling.

* * * * *